US012325072B2

(12) United States Patent
Yoshinari et al.

(10) Patent No.: US 12,325,072 B2
(45) Date of Patent: Jun. 10, 2025

(54) R—FE—B-BASED SINTERED MAGNET

(71) Applicant: Shin-Etsu Chemical Co., Ltd., Tokyo (JP)

(72) Inventors: Akihiro Yoshinari, Echizen (JP); Hiroki Iida, Echizen (JP); Koichi Hirota, Echizen (JP); Mikio Yoshida, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 561 days.

(21) Appl. No.: 17/772,332

(22) PCT Filed: Nov. 5, 2020

(86) PCT No.: PCT/JP2020/041346
§ 371 (c)(1),
(2) Date: Apr. 27, 2022

(87) PCT Pub. No.: WO2021/095633
PCT Pub. Date: May 20, 2021

(65) Prior Publication Data

US 2022/0406498 A1 Dec. 22, 2022

(30) Foreign Application Priority Data

Nov. 11, 2019 (JP) ................................ 2019-203978

(51) Int. Cl.

| | |
|---|---|
| ***B22F 3/00*** | (2021.01) |
| ***C22C 38/00*** | (2006.01) |
| ***C22C 38/06*** | (2006.01) |
| ***C22C 38/14*** | (2006.01) |
| ***C22C 38/16*** | (2006.01) |
| ***H01F 1/057*** | (2006.01) |

(52) U.S. Cl.
CPC .............. *B22F 3/00* (2013.01); *C22C 38/002* (2013.01); *C22C 38/005* (2013.01); *C22C 38/06* (2013.01); *C22C 38/14* (2013.01); *C22C 38/16* (2013.01); *H01F 1/0577* (2013.01); *C22C 2202/02* (2013.01)

(58) Field of Classification Search
CPC .... B22F 3/00; B22F 2998/10; B22F 2999/00; C22C 38/002; C22C 38/005; C22C 38/06; C22C 38/14; C22C 38/16; C22C 2202/02; H01F 1/0577
See application file for complete search history.

(56) References Cited

U.S. PATENT DOCUMENTS

| | | | | |
|---|---|---|---|---|
| 2005/0268989 | A1 | 12/2005 | Tomizawa et al. | |
| 2010/0233016 | A1 | 9/2010 | Tsubokura et al. | |
| 2015/0170810 | A1 | 6/2015 | Miwa et al. | |
| 2015/0235750 | A1 | 8/2015 | Miwa et al. | |
| 2016/0225502 | A1 | 8/2016 | Miwa et al. | |
| 2018/0090249 | A1* | 3/2018 | Ohashi | B22F 3/16 |
| 2018/0090250 | A1 | 3/2018 | Ohashi et al. | |
| 2019/0276917 | A1 | 9/2019 | Iwasaki | |
| 2020/0082962 | A1 | 3/2020 | Ohashi et al. | |

FOREIGN PATENT DOCUMENTS

| | | | |
|---|---|---|---|
| CN | 104137197 | A | 11/2014 |
| CN | 105118593 | A | 12/2015 |
| EP | 3550576 | A1 | 10/2019 |
| JP | 4-184901 | A | 7/1992 |
| JP | 4-330702 | A | 11/1992 |
| JP | 9-31608 | A | 2/1997 |
| JP | 2009-260338 | A | 11/2009 |
| JP | 2016-143828 | A | 8/2016 |
| WO | 2004/081954 | A1 | 9/2004 |
| WO | 2009/004994 | A1 | 1/2009 |
| WO | 2013/122255 | A1 | 8/2013 |
| WO | 2013/191276 | A1 | 12/2013 |

OTHER PUBLICATIONS

Extended (Supplementary) European Search Report dated Oct. 19, 2023, issued in counterpart EP Application No. 20886644.2. (12 pages).
Office Action dated Mar. 7, 2024, issued in counterpart TW application No. 109139125, with English translation. (15 pages).
International Search Report dated Feb. 2, 2021, issued in counterpart International Application No. PCT/JP2020/041346 (3 pages).

* cited by examiner

*Primary Examiner* — Adil A. Siddiqui
(74) *Attorney, Agent, or Firm* — WHDA, LLP

(57) ABSTRACT

Provided is an R—Fe—B-based sintered magnet which has a composition comprising R (wherein R represents at least one element selected from rare earth elements, and essentially contains Nd), B, M (wherein M represents at least one element selected from Si, Al, Mn, Ni, Co, Cu, Zn, Ga, Ge, Pd, Ag, Cd, In, Sn, Sb, Pt, Au, Hg, Pb and Bi), X (wherein X represents at least one element selected from Ti, Zr, Hf, Nb, V and Ta) and C, with a remainder comprising Fe, O and unavoidable impurities, and has a main phase comprising $R_2Fe_{14}B$ and a grain boundary phase comprising an R—C phase having a higher R concentration and a higher C concentration than those in the main phase, the R—Fe—B-based sintered magnet being characterized in that the area ratio of the R—C phase in a cross section of the magnet is more than 0% and 0.5% or less.

6 Claims, No Drawings

R—FE—B-BASED SINTERED MAGNET

TECHNICAL FIELD

This invention relates to a R—Fe—B-type rare-earth sintered magnet in which the residual flux density has been increased while suppressing a decrease in coercivity.

BACKGROUND ART

The range of application and production volume of R—Fe—B-type sintered magnets (sometimes referred to below as "Nd magnets"), as functional materials that are necessary and indispensable to energy savings and higher functionality, is increasing year by year. Such magnets are used in, for example, drive motors and power steering motors for hybrid cars and electric cars, in AC compressor motors and in voice coil motors (VCM) for hard disk drives. The high residual flux density (abbreviated below as "Br") of R—Fe—B-type sintered magnets is a major advantage in these various uses, but a further increase in Br is desired in order to, for example, further reduce the size of the motors.

Hitherto known methods for increasing the Br of R—Fe—B sintered magnets include that of lowering the R content so as to increase the proportion of the $R_2Fe_{14}B$ phase in the sintered magnet, and that of lowering the amount of added elements which enter into solid solution with the $R_2Fe_{14}B$ phase and decrease the Br.

However, it is known that lowering the amount of R and other added elements ends up reducing the coercivity (abbreviated below as "$H_{cJ}$") that has a close bearing on the heat resistance of a sintered magnet. In particular, when the amount of R elements is reduced, in the R—Fe—B-type sintered magnet sintering step where densification accompanied by liquid phase formation arises, the sinterability decreases and there is also a risk of abnormal grain growth occurring. Hence, to obtain R—Fe—B-type sintered magnets having higher properties, it is necessary to attain a high Br while suppressing a decrease in $H_{cJ}$ from a reduction in the amount of R and other added elements. The addition of heavy rare-earth elements such as Dy and Tb in order to suppress a decrease in $H_{cJ}$ or increase the $H_{cJ}$ is commonly known. However, because the addition of these elements leads to a decrease in Br and also because, in terms of resources, such elements are scarce and expensive, techniques that relate to lowering the amount of Dy, Tb and other heavy rare-earth elements used have hitherto been disclosed.

For example, WO 2013/191276 A1 (Patent Document 1) discloses a sintered magnet in which, by making the boron (B) content lower than the stoichiometric composition, adding from 0.1 to 1.0 wt % of Ga and also adjusting the weight ratios of B, Nd, Pr, C and Ga such that the values for [B]/([Nd]+[Pr] and ([Ga]+[C])/[B] satisfy specific relationships, a high $H_{cJ}$ can be obtained even in compositions in which reduced amounts of heavy rare-earth elements such as Dy and Tb are used.

WO 2004/081954 A1 (Patent Document 2) discloses a sintered magnet having a higher Br that can be obtained by setting the B content to an approximately stoichiometric composition and thus suppressing the formation of an $R_{1.1}Fe_4B_4$ phase. Moreover, by including from 0.01 to 0.08 wt % of Ga, precipitation of a $R_2Fe_{17}$ phase which leads to a decrease in $H_{cJ}$ when the amount of B is lower than the stoichiometric composition is suppressed, enabling a high Br and a high $H_{cJ}$ to both be achieved.

JP-A 2016-143828 (Patent Document 3) discloses that by forming a structure having R—Ga—C enriched regions, when the grain size of the raw materials is refined for increasing $H_{cJ}$ with higher amount of lubricant to suppress decreasing orientation, enables a high $H_{cJ}$ without adverse effect of lubricant to $H_{cJ}$.

PRIOR ART DOCUMENTS

Patent Documents

Patent Document 1: WO 2013/191276 A1
Patent Document 2: WO 2004/081954 A1
Patent Document 3: JP-A 2016-143828

SUMMARY OF INVENTION

Technical Problem

In the magnet disclosed in Patent Document 1, the amount of heavy rare-earth elements such as Dy and Tb used becomes correspondingly smaller with the addition of at least 0.1 wt % of Ga, enabling saturation magnetization of the $R_2Fe_{14}B$ phase to be increased. Yet, with Ga addition, saturation magnetization of the $R_2Fe_{14}B$ phase decreases, and so a sufficient increase in Br is not necessarily achieved.

In the art disclosed in Patent Document 2, although good magnetic properties are indeed obtained in the case of R—Fe—B-type sintered magnets having an O concentration of about 0.4 wt %, the description of the relationship between the oxygen concentration in the sintered magnet and the magnetic properties is inadequate. At oxygen concentrations lower than this, especially at 0.2 wt % or less, the behavior of these properties changes markedly and achieving both a high Br and a high Hi is not always possible.

In the art disclosed in Patent Document 3, because Ga is included in the relatively large amount of 0.42 to 1.5 wt %, saturation magnetization of the $R_2Fe_{14}B$ phase decreases, making it difficult to obtain a high Br. Also, in order to form R—Ga—C enriched regions, the production process includes, in an ordinary sintering step, a holding step that holds the compact being sintered for a given length of time at between 500 and 700° C., which is disadvantageous in terms of productivity.

The present invention was arrived at in light of these problems, the object of the invention being to provide R—Fe—B-type sintered magnets which, by adjusting and optimizing the ratios in the amounts of constituent elements therein and the structure, have a high Br and a stable $H_{cJ}$.

Solution to Problem

In order to achieve this object, the inventors have conducted intensive investigations on R—Fe—B-type sintered magnets containing R (R being one or more element selected from the rare-earth elements, with Nd being essential), B, M (M being one or more element selected from Si, Al, Mn, Ni, Co, Cu, Zn, Ga, Ge, Pd, Ag, Cd, In, Sn, Sb, Pt, Au, Hg, Pb and Bi), X (X being one or more element from Ti, Zr, Hf Nb, V and Ta), C, O and Fe in which they studied magnet structures having a main phase composed of an $R_2Fe_4B$ intermetallic compound and having a grain boundary phase. As a result, they have discovered that by possessing the specific structural morphology described below, compositions made up of this main phase and the grain boundary phase are able to exhibit both a high Br and a stable $H_{cJ}$. This discovery ultimately led to the present invention.

Accordingly, this invention provides the following R—Fe—B-type sintered magnet.

[1]

An R—Fe—B-type sintered magnet having a composition which consists essentially of from 12.5 to 14.5 at % of R (where R is one or more element selected from the rare-earth elements, with Nd being essential), from 5.0 to 6.5 at % of B, from 0.15 to 5.0 at % of M (where M is one or more element selected from Si, Al, Mn, Ni, Co, Cu, Zn, Ga, Ge, Pd, Ag, Cd, In, Sn, Sb, Pt, Au, Hg, Pb and Bi), from 0.02 to 0.5 at % of X (where X is one or more element selected from Ti, Zr, Hf, Nb, V and Ta) and from 0.1 to 1.6 at % of C, with the balance being Fe, O and inadvertent impurities, and which contains a main phase that is an $R_2Fe_{14}B$ intermetallic compound and a grain boundary phase, wherein the sintered magnet has, in the grain boundary phase, an R—C phase with higher R and C concentrations than the main phase, the areal ratio of the R—C phase in a cross-section of the R—Fe—B-type sintered magnet being greater than 0 and up to 0.5%.

[2]

The R—Fe—B-type sintered magnet of [1], wherein the content of R is from 12.8 to 14.0 at %.

[3]

The R—Fe—B-type sintered magnet of [1] or [2], wherein the content of O is from 0.1 to 0.8 at %.

[4]

The R—Fe—B-type sintered magnet of any of [1] to [3], wherein the content of C is from 0.2 to 1.0 at %.

[5]

The R—Fe—B-type sintered magnet of any of [1] to [4], wherein the content of B is from 5.2 to 5.9 at %.

[6]

The R—Fe—B-type sintered magnet of any of [1] to [5], wherein the magnet includes, as a portion of the M elements, more than 0 and up to 0.1 at % of Ga.

[7]

The R—Fe—B-type sintered magnet of any of [1] to [6], wherein the R—C phase has a C concentration that is at least 20 at % higher than in the main phase.

Advantageous Effects of Invention

The R—Fe—B-type sintered magnet of the invention, through adjustments in the structural morphology that includes a main phase which is an $R_2Fe_{14}B$ intermetallic compound and a grain boundary phase, is able to achieve both a high Br and a high $H_{cJ}$, which have hitherto been mutually incompatible properties.

DESCRIPTION OF EMBODIMENTS

The R—Fe—B-type sintered magnet of the invention has, as noted above, a composition that consists essentially of from 12.5 to 14.5 at % of R (where R is one or more element selected from the rare-earth elements, with Nd being essential), from 5.0 to 6.5 at % of B, from 0.15 to 5.0 at % of M (where M is one or more element selected from Si, Al, Mn, Ni, Co, Cu. Zn, Ga, Ge, Pd, Ag, Cd, In, Sn. Sb, Pt, Au. Hg, Pb and Bi), from 0.02 to 0.5 at % of X (where X is one or more element selected from Ti, Zr, Hf, Nb, V and Ta) and from 0.1 to 1.6 at % of C, with the balance being Fe, O and inadvertent impurities.

The constituent element R in the sintered magnet of the invention is, as noted above, one or more element selected from the rare-earth elements, with Nd being essential. The rare-earth elements other than Nd are preferably Pr, La, Ce, Gd, Dy, Tb and Ho, more preferably Pr, Dy and T, and most preferably Pr. The essential constituent Nd accounts for preferably at least 60 at %, and especially at least 70 at %, of the overall R.

The R content is, as noted above, from 12.5 to 14.5 at %, and is preferably from 12.8 to 14.0 at %. At an R content below 12.5 at %, α-Fe crystallization arises in the starting to alloy; even with homogenization, eliminating the α-Fe is difficult, resulting in large declines in the $H_{cJ}$) and squareness of R—Fe—B-type sintered magnets. Even in cases where the starting alloy is produced by strip casting in which α-Fe crystallization occurs with difficulty, given that α-Fe crystallization does occur, the $H_{cJ}$ and squareness of R—Fe—B-type sintered magnets undergo large declines. In addition, because the amount of liquid phase consisting primarily of R constituents that has the role of promoting densification in the course of sintering becomes lower, the sinterability decreases and densification of the R—Fe—B-type sintered magnet is inadequate. On the other hand, when the R content exceeds 14.5 at %, there are no problems in production, but the proportion of the $R_2Fe_{14}B$ phase in the sintered magnet becomes lower, resulting in a lower Br.

The sintered magnet of the invention, as noted above, contains from 5.0 to 6.5 wt % of boron (B). The content is more preferably from 5.2 to 5.9 at %, and even more preferably from 5.3 to 5.7 at %. In this invention, the B content, together with the subsequently described C and X contents, is a factor that determines the range in the oxygen concentration required to obtain a stable $H_{cJ}$. At a B content below 5.0 at %, the proportion of the $R_2Fe_{14}B$ phase that forms is low and the Br markedly decreases; along with this, an $R_2Fe_{17}$ phase forms, resulting in a lower He. On the other hand, at a B content in excess of 6.5 at %, a B-rich phase forms and the ratio of $R_2Fe_{14}B$ phase in the magnet decreases, resulting in a decrease in Br.

As noted above, the sintered magnet of the invention includes as the element M one or more element selected from Si, Al, Mn, Ni, Co. Cu, Zn, Ga, Ge, Pd, Ag, Cd, In, Sn, Sb. Pt, Au, Hg, Pb and Bi. The M content is, as noted above, from 0.15 to 5.0 at %, and is preferably from 0.3 to 4.0 at %, and more preferably from 0.5 to 3.0 at %. At an M content below 0.15 at %, obtaining a sufficient $H_{cJ}$ is difficult. On the other hand, an M content greater than 5.0 at % may lower the Br. Although not particularly limited, of the M elements, it is especially preferable for the inventive sintered magnet to include Co, Cu, Al and Ga.

The Co content sometimes affects the Cuie temperature, corrosion resistance and He, and so should be set while weighing the balance among these properties. For example, the Co content, from the standpoint of obtaining Curie temperature and corrosion resistance-improving effects due to the inclusion of Co, is preferably at least 0.1 at %, and more preferably at least 0.5 at %. From the standpoint of stably obtaining a high $H_{cJ}$, the Co content is preferably not more than 3.5 at %, and more preferably not more than 2.0 at %.

The Cu content sometimes affects the optimal temperature range in low-temperature heat treatment during magnet production, the sinterability during sintering treatment and also the magnetic properties (Br, $H_{cJ}$) obtained, and so should be set while weighing the balance among these properties. For example, the Cu content, from the standpoint of obtaining an optimal temperature range in post-sintering low-temperature heat treatment which is suitably carried out in order to ensure good productivity, is preferably at least 0.05 at %, and more preferably at least 0.1 at %. From the standpoint of obtaining a good sinterability and high magnetic properties (Br, $H_{cJ}$), the Cu content is preferably not more than 0.5 at %, and more preferably not more than 0.3 at %.

The Al and Ga contents sometimes affect the magnetic properties (Br, $H_{cJ}$), and so should be set while weighing the balance between Br and $H_{cJ}$. For example, the Al content, from the standpoint of obtaining a sufficient $H_{cJ}$, is preferably at least 0.05 at %, and from the standpoint of obtaining a high Br, is preferably not more than 1.0 at %, and more preferably not more than 0.5 at %. In addition, the Ga content, from the standpoint of the balance between Br and $H_{cJ}$, is preferably more than 0 at % and up to 0.1 at %, and is more preferably from 0.05 to 0.1 at %.

As noted above, the sintered magnet of the invention includes as the X elements one more element selected from Ti, Zr, Hf, Nb, V and Ta. By including these elements, abnormal grain growth during sintering can be suppressed due to the X—B phase that forms. Although not particularly limited, it is preferable to include Zr as at least one of these X elements.

The content of X is, as noted above, from 0.02 to 0.5 at %, and is preferably from 0.05 to 0.3 at %, and more preferably from 0.07 to 0.2 at %. When the content of X is less than 0.02 at %, the effect of suppressing abnormal growth by crystal grains in the course of sintering cannot be obtained. On the other hand, when the content of X exceeds 0.5 at %, an X—B phase forms and so the amount of B available for $R_2Fe_{14}B$ phase formation diminishes, which may lead to a lower Br on account of a decrease in the $R_2Fe_{14}B$ phase ratio and, in turn, to a major decrease in H owing to formation of an $R_2Fe_{17}$ phase.

The carbon (C) content in the sintered magnet of the invention is, as noted above, from 0.1 to 1.6 at %, and is preferably from 0.2 to 1.0 at %. Because the carbon originates from, for example, the raw materials and lubricant that is added to increase orientation of the powder during pressing in a magnetic field, it is difficult to obtain an R—Fe—B-type sintered magnet having a carbon content below 0.1 at %. On the other hand, when the carbon content exceeds 1.6 at %, much R—C phase is present in the sintered magnet, resulting in a marked decrease in $H_{cJ}$.

The sintered magnet of the invention contains R, B, M, X and C, and moreover includes as the balance Fe and O. The O content in this case, although not particularly limited, is preferably from 0.1 to 0.8 at %, and more preferably from 0.2 to 0.5 at %. Apparently, by adjusting the O content in this way, given phases such as the subsequently described R—C phase precipitate out well.

Aside from the above elements, the sintered magnet of the invention may include as inadvertent impurities such elements as H, N, F, Mg, P, S, Cl and Ca. In this case, inadvertent impurities are allowable in an overall amount of up to 0.1 wt % based on the sum of the above-mentioned constituent elements of the magnet and these inadvertent impurities, although it is preferable for the amount of these inadvertent impurities to be as low as possible. In particular, of these inadvertent impurities, from the standpoint of obtaining a good $H_{cJ}$, the content of N is preferably 0.5 at % or less.

The sintered magnet of the invention consists essentially of the above-described elemental composition. In addition, it contains an $R_2Fe_{14}B$ intermetallic compound as the main phase and a grain boundary phase, and moreover has in the grain boundary phase an R—C phase in which the R and C concentrations are higher than in the main phase, the areal ratio of the R—C phase in a cross-section of the sintered magnet being more than 0 and up to 0.5%. By having this structural morphology, a high Br and a stable $H_{cJ}$ can both be achieved. The reason for this, although not entirely clear, is conjectured to be as follows.

Some of the B in the $R_2Fe_{14}B$ compound is known to be substitutable with C, but C generally forms an R—O—C phase, which is an impurity phase, at crystallization grain boundary triple junction and substantially does not contribute to formation of the main phase. Yet, when attempting to obtain a high Br by lowering the R content as in this invention, it is necessary to lower the content of the impurity O in order to promote liquid phase sintering. Under such low-oxygen content conditions, it is thought that the amount of R—O—C phase formation decreases and that, with this, some of the C may form $R_2Fe_{14}C$ or an R—C phase. Also, the melting points of compounds in which R and C are the chief elements are known to be higher than the sintering temperature of the R—Fe—B-type sintered magnet, but we have found that the content of R—C phase included in the sintered magnet structure is dependent on the concentration of C included in the raw materials. That is, a higher temperature than the sintering temperature of the $R_2Fe_{14}B$ sintered magnet is needed to form the R—C phase; the R—C phase is thought to be formed primarily at the stage of starting alloy production by high-frequency melting or the like. Also, the C that is consumed as the high-melting R—C phase does not contribute to formation of the main phase; conversely, the consumption of R leads to a decrease in $H_{cJ}$. Based on such reasoning, the inventors have lowered as much as possible the amount of C included in the alloy raw materials, thereby optimizing the amount of R—C phase included in the R—Fe—B-type sintered magnet and achieving both a high Br and a high Ha.

Here, "the areal ratio of the R—C phase in a cross-section of the sintered magnet" refers to the areal ratio of the R—C phase measured in a given region of an arbitrary cross-section of the sintered magnet. In this case, "arbitrary cross-section" means that the areal ratio is achieved regardless of whether it is a cross-section obtained by cutting the sintered magnet at some particular place, or a cross-section obtained by cutting the sintered magnet at any place. Also, the size of the "given region" in this cross-section is set as appropriate for the measuring instrument, etc. However, to be able to accurately grasp the state of the overall magnet, this is preferably made a region having a surface area of at least 15,000 $\mu m^2$, and more preferably a region having a surface area of at least 30,000 $\mu m^2$. It is also preferable to carry out measurement in a plurality of regions and to use the average of these measurements as the areal ratio. In this case, it is desirable for the total surface area of the plurality of regions furnished for measurement to be set so as to be the preferred surface area indicated above.

As noted above, the areal ratio of the R—C phase in one region of the arbitrary cross-section is more than 0 and up to 0.5%. To more reliably obtain a sufficient $H_{cJ}$, it is preferably at least 0.01% and up to 0.3%, and more preferably at least 0.01% and up to 0.27%. When the areal ratio of this R—C phase is 0, that is, when substantially no R—C phase is present, achieving both a high Br and a stable $H_{cJ}$ is difficult and so the object of this invention cannot be achieved. On the other hand, when the areal fraction is more than 0.5%, the amount of R required to form the grain boundary phase is inadequate due to formation of an R—C phase, resulting in decreases in the $H_{cJ}$ and the squareness.

The areal ratio can be ascertained by examining the structure in a cross-section of the sintered magnet with a scanning electron microscope (SEM). In this case, analysis of the composition can be carried out using a SEM equipped with an energy-dispersive x-ray spectrometer (EDS). Generally, in the examination of a metal surface, pre-treatment of the cross-section to be examined is carried out using wet mechanical polishing. However, in this invention, to remove the influence of superficial oxidation and the like, surface machining is carried out using a focused ion beam-scanning electron microscope (FIB-SEM), and examination and compositional analysis can be carried out directly in this state without atmospheric exposure. The areal ratio can be calculated by importing the resulting electronic image to image analysis software and comparing the contrast with compositional information.

Aside from R and C, the R—C phase included in the grain boundary phase may also include small amounts of O, Fe, Cu and the like, although it consists essentially of R and C and, as mentioned above, is a phase with higher R and C concentrations than the main phase. The R concentration therein, although not particularly limited, is typically at least 30 at % and up to 50 at %, and preferably at least 35 at % and up to 45 at %. The C concentration is preferably at least 10 at % higher, and more preferably at least 20 at % higher, than in the main phase. When the R and C concentrations of the R—C phase are adjusted in this way, the R—C phase is formed in a good state and the objects of the invention can be better and more reliably achieved.

Next, a method for producing the R—Fe—B-type sintered magnet of the invention is described.

The steps carried out when producing the R—Fe—B-type sintered magnet of the invention are basically the same as those used in a conventional powder sintering method, and are not particularly limited. They generally include a melting step which melts the raw material to obtain a starting alloy, a pulverizing step which pulverizes the starting alloy having a predetermined composition so as to prepare an alloy fine powder, a pressing step which presses the alloy fine powder in an applied magnetic field to form a compact, and a heat treatment step which heat treats the compact to form a sintered body.

First, in the melting step, the metals or alloys serving as the sources of the various elements are weighed out so as to give the above predetermined composition in the invention, and this raw material is melted by, for example, high-frequency heating and then cooled to produce the starting alloy. At this time, it is necessary for the metals or alloys used as the raw materials to have low C contents, such that the C concentration of the starting alloy obtained after the melting step becomes 0.03 wt % or less, and it is desirable to use raw materials of high purity such that the C concentration of the starting alloy becomes 0.01 wt % or less. Casting of the starting alloy is generally carried out using a melt casting process in which the molten alloy is cast into a flat mold or a book mold, or a strip casting method. Alternatively, it is also possible to employ in this invention a two-alloy process wherein an alloy close in composition to the $R_2Fe_{14}B$ compound serving as the main phase of the R—Fe—B-type alloy and an R-rich alloy that serves as a liquid phase aid at the sintering temperature are separately produced, following which these alloys are coarsely pulverized and then weighed out and mixed together. However, in the alloy close in composition to the main phase, depending on the cooling rate during casting and the alloy composition, an α-Fe phase tends to crystallize. Therefore, in order to make the microstructure uniform and eliminate the α-Fe phase, where necessary, it is preferable to carry out at least one hour of homogenizing treatment at between 700° C. and 1,200° C. in a vacuum or an argon atmosphere. In cases where the alloy close in composition to the main phase is produced by a strip casting process, homogenization can be omitted. As for production of the R-rich alloy that serves as the liquid phase aid, aside from the above casting method, use can also be made of a liquid quenching process.

The pulverizing step may a multi-stage step that includes, for example, a coarse pulverizing step and a fine pulverizing step. A jaw crusher. Braun mill, pin mill or hydrogen decrepitation, for example, may be used in the coarse pulverizing step. In the case of alloys produced by strip casting, a coarse powder that has been coarsely pulverized to a size of, for example, from 0.05 to 3 mm, especially from 0.05 to 1.5 mm, can generally be obtained by employing hydrogen decrepitation. In the fine pulverizing step, the coarse powder obtained in the coarse pulverizing step is finely pulverized to, for example, from 0.2 to 30 μm, and especially from 0.5 to 20 μm, using a method such as jet milling. In either or both of the coarse pulverizing and fine pulverizing steps on the starting alloy, where necessary, the carbon content may be adjusted to the predetermined range by adding an additive such as a lubricant. In this case, illustrative, non-limiting examples of lubricant that may be used include stearic acid and other fatty acids, alcohols, esters and metal soaps. Aside from lubricants, carbon black and hydrocarbons such as paraffin and polyvinyl alcohol may also be added as C sources. The coarse pulverizing and fine pulverizing steps on the starting alloy are preferably carried out in a gas atmosphere such as nitrogen gas or argon gas. The oxygen content may be adjusted to the predetermined range by controlling the oxygen concentration within the gas atmosphere.

In the pressing step, the alloy powder is compacted with compression molding machine while applying a 400 to 1,600 kA/m magnetic field and orienting the powder in the direction of easy magnetization. The density of the compact is preferably set at this time to from 2.8 to 4.2 g/cm$^3$. To ensure the strength of the compact and obtaining a good handleability, it is preferable to set the density of the compact to at least 2.8 g/cm$^3$. On the other hand, to obtain a suitable Br by ensuring good orientation of the particles during the application of pressure while achieving an adequate compact strength, it is preferable for the density of the compact to be set to not more than 4.2 g/cm$^3$. In order to suppress oxidation of the alloy fine powder, it is preferable to carry out pressing in a gas atmosphere such as nitrogen gas or argon gas.

In the heat treatment step, the compact obtained in the pressing step is sintered in a non-oxidizing atmosphere such as a high vacuum or argon gas. It is generally preferable to carry out such sintering by holding the compact for a period of from 0.5 to 5 hours within a temperature range of from 950° C. to 1,200° C. When such sintering is complete, cooling may be carried out by gas quenching (cooling rate, 220° C./min), controlled cooling (cooling rate, 1 to 20° C./min) or furnace cooling, the magnetic properties of the resulting R—Fe—B-type sintered magnet being similar in each case.

Following the above heat treatment for sintering, although not particularly limited, heat treatment at a lower temperature than the sintering temperature may be carried out in order to increase the $H_{cJ}$. This post-sintering heat treatment may be carried out as two-stage heat treatment consisting of high-temperature heat treatment and low-temperature heat treatment, or low-temperature heat treatment alone may be carried out. In such post-sintering heat treatment, the sintered body is preferably heat-treated at a temperature of between 600° C. and 950° C. in high-temperature heat treatment, and is preferably heat-treated at a temperature between 400° C. and 600° C. in low-temperature heat treatment. Cooling at this time may likewise be carried out by gas quenching (cooling rate, ≥20° C./min), controlled cooling (cooling rate, 1 to 20° C./min) or furnace cooling. R—Fe—B-type sintered magnets of similar magnetic properties being obtainable with any of these cooling methods.

The resulting R—Fe—B-type sintered magnet is machined to a predetermined shape and a slurry containing one or more type of powder selected from $R^1$ oxides, $R^2$ fluorides, $R^3$ acid fluorides, $R^4$ hydroxides, R carbonates, basic carbonates of $R^6$ and $R^7$ single metals or alloys ($R^1$ to $R^7$ being one or more selected from the rare-earth elements; these may be the same or may each be different) is coated or painted onto the magnet surfaces, after which heat treatment may be carried out in the state in which the powder has been made present on the magnet surfaces. This treatment is referred to as the grain boundary diffusion method. The pain boundary diffusion heat-treatment temperature is a temperature that is lower than the sintering temperature and preferably at least 350° C. The heat treatment time is not particularly limited, although to obtain a sintered magnet having a good structure and good magnetic properties, the heat treatment time is preferably from 5 minutes to 80 hours, and more preferably from 10 minutes to 50 hours. This grain boundary diffusion treatment causes the $R^1$ to $R^7$ included in the powder to diffuse within the magnet, enabling an increase in the $H_{cJ}$ to be achieved. The rare-earth elements introduced by this grain boundary diffusion are referred to above as $R^1$ to $R^7$ for the sake of convenience. However, following grain boundary diffusion, these are all encompassed by the R constituent in the inventive magnet.

EXAMPLES

The invention is illustrated more fully below by way of Examples and Comparative Examples, although the invention is not limited by these Examples.

Example 1

The raw materials were weighed out such as to give the Alloy A composition in Table 1 and melted with a high-frequency induction furnace in an argon gas atmosphere, following which an alloy ribbon was produced by a strip casting process in which the molten alloy was cooled on a water-cooled copper roll. It is possible at this time to adjust the amount of C included in the alloy by way of the amount of C included in the raw materials. Such adjustment may be effected by, for example, the amount of C included in Nd metal produced by electrolysis or by the addition of carbon black. The alloy ribbon thus produced was then subjected to hydrogen decrepitation, giving a coarse powder, following which 0.1 wt % of stearic acid was added as a lubricant to the resulting coarse powder and mixed therein.

The mixture of coarse powder and lubricant was finely pulverized with a jet mill in a stream of nitrogen so as to give a fine powder having an average particle size of about 3.5 μm. At this time, the oxygen concentration within the jet mill system was set to 0 ppm. Next, the fine powder was charged, within a nitrogen atmosphere, into the mold of a powder-compacting press equipped with an electromagnet and, while being oriented in a 15 kOe (1.19 MA/m) magnetic field, was pressed in a direction perpendicular to the magnetic field.

The resulting compact was sintered in a vacuum at 1,050° C. for 3 hours and then cooled to 200° C. or below, following which 2 hours of high-temperature heat treatment at 900° C. and 3 hours of low-temperature heat treatment at 500° C. were carried out, giving a sintered body. The composition of the resulting sintered body is shown in Table 2. The metallic elements were measured by inductively coupled plasma atomic emission spectroscopy (ICP-OES), the carbon was measured by the combustion-infrared absorption method, and the oxygen was measured by the inert gas fusion-infrared absorption method.

Comparative Example 1

Raw materials were weighed out such as to give the Alloy C composition in Table 1 and an alloy ribbon was produced in the same way as in Example 1. The alloy ribbon thus produced was then subjected to hydrogen decrepitation, giving a coarse powder, following which the coarse powder, without the addition of a lubricant thereto, was finely pulverized with a jet mill in a stream of nitrogen to an average particle size of about 3.5 μm. Pressing and heat treatment were subsequently carried out in the same way as in Example 1 to give a sintered body, the composition of which was analyzed in the same way as in Example 1. The results are shown in Table 2.

Example 21

Raw materials were weighed out such as to give the Alloy B composition in Table 1 and an alloy ribbon was produced in the same way as in Example 1. The alloy ribbon thus produced was then subjected to hydrogen decrepitation, giving a coarse powder, following which 0.05 wt. of stearic acid was added as a lubricant to the coarse powder and mixed in. Pulverizing, pressing and heat treatment were subsequently carried out in the same way as in Example 1 to give a sintered body, the composition of which was analyzed in the same way as in Example 1. The results are shown in Table 2.

Comparative Example 2

Alloy ribbon production, hydrogen decrepitation and mixture of a lubricant into the resulting coarse powder were carried out in the same way as in Example 1. Next, the mixture of coarse powder and lubricant was pulverized with a jet mill in a stream of nitrogen, giving a fine powder having an average particle size of about 3.5 μm. The oxygen concentration in the jet mill system was suitably adjusted at this time, thereby setting the O content so as to be higher than that of the powder in Example 1. The fine powder thus produced was then subjected to pressing and heat treatment by the same methods as in Example 1 to give a sintered body, the composition of which was analyzed in the same way as in Example 1. The results are shown in Table 2.

The center portion of each of the resulting sintered bodies obtained above in Examples 1 and 2 and Comparative Examples 1 and 2 was cut out into a rectangular parallelepiped shape having dimensions of 18 mm×15 mm×12 mm to give a sintered magnet, and the magnetic properties (Br, Hi) of each sintered magnet were measured using a B—H tracer. The results are presented in Table 2.

The structures of the above sintered magnets were examined using a focused ion beam scanning electron microscope (FIB-SEM) (Scios, from FEI) and a scanning transmission electron microscope (STEM) (JEM-ARM200F, from JEOL, Ltd.), and the areal ratio of the R—C phase included in the grain boundary phase was computed. The analytical results are presented in Table 2. The method of analysis involved, first, FIB removal of the surface portion of the cross-section of each of the samples obtained, followed by the acquisition of a backscattered electron image and a secondary electron image of a 69×46 μm rectangular region. Compositional analysis of each phase having the same contrast in the respective images of the same region was carried out by energy dispersive x-ray spectroscopy (EDS), and identification of each phase was carried out. In addition, the electron images obtained were imported into image analysis software, the contrast and the compositional information obtained earlier were compared, and the areal ratio of the R—C phase was computed. After surface machining by FIB, examination and compositional analysis were carried out as a series of operations in this state without allowing atmospheric exposure. The results of this structural examination are values obtained by averaging the results for five places of measurement. Table 3 presents, by way of illustration, the analytical values for the R—C phase in Example 1.

TABLE 1

| | [Nd] (at %) | [Fe] (at %) | [Co] (at %) | [B] (at %) | [Al] (at %) | [Cu] (at %) | [Zr] (at %) | [Ga] (at %) | [C] (at %) |
|---|---|---|---|---|---|---|---|---|---|
| Alloy A | 13.7 | balance | 1.1 | 5.5 | 0.5 | 0.2 | 0.07 | 0.1 | 0.04 |
| Alloy B | 13.7 | balance | 1.1 | 5.5 | 0.5 | 0.2 | 0.07 | 0.1 | 0.19 |
| Alloy C | 13.7 | balance | 1.1 | 5.5 | 0.5 | 0.2 | 0.07 | 0.1 | 0.45 |

TABLE 2

| | Type of alloy | [C] (at %) | [N] (at %) | [O] (at %) | Areal ratio of R—C phase (%) | Br (T) | $H_{cJ}$ (kA/m) | Expected $H_{cJ}$ based on decrease in orientation (kA/m) |
|---|---|---|---|---|---|---|---|---|
| Example 1 | Alloy A | 0.42 | 0.2 | 0.2 | 0.23 | 1.46 | 1.130 | — |
| Comparative Example 1 | Alloy C | 0.45 | 0.3 | 0.2 | 0.98 | 1.43 | 1.110 | 1.190 |
| Example 2 | Alloy B | 0.39 | 0.3 | 0.2 | 0.45 | 1.45 | 1.120 | 1.150 |
| Comparative Example 2 | Alloy A | 0.36 | 0.1 | 0.6 | 0 | 1.46 | 700 | — |

As shown in Tables 1 and 2, the sintered magnets of Examples 1 and 2 in which the areal ratio of the R—C phase is more than 0 and up to 0.5% have excellent properties (Br and $H_{cJ}$) compared with Comparative Examples 1 and 2. In Comparative Example 1, because a lubricant is not added at the time of sintered magnet production, the orientation during pressing decreases and a low value is obtained for Br. However, it is known that the lower the orientation in R—Fe—B-type sintered magnets, the higher the $H_{cJ}$. Specifically, these fluctuate in a ratio of about $-4\times10^{-4}$ T/(kA/m). Taking this into account, the He in Comparative Example 1 where all of the C included in the sintered magnet comes from the starting alloy is more than 50 kA/m lower than anticipated in a case having about the same degree of orientation as in Example 1, and so can be acknowledged to be significantly inferior compared with Example 1. Also, the $H_{cJ}$) in Example 2 in which the amount of lubricant added was 0.05 wt % had a difference of less than 50 kA with the $H_{cJ}$ value obtained by factoring in a decrease in orientation, indicating that a good $H_{cJ}$ was obtained. On the other hand, in Comparative Example 2 in which the O concentration in the sintered magnet was high compared with the C concentration and which contained no R—C phase, the $H_{cJ}$ was much lower than in Example 1.

TABLE 3

| | | C (at %) | O (at %) | Fe (at %) | Cu (at %) | Nd (at %) |
|---|---|---|---|---|---|---|
| Example 1 | R—C phase | 45 | 5 | 9 | 1 | 40 |
| | main phase | 16 | 1 | 70 | 0 | 11 |

As shown in Table 3, as a result of EDS analyses of the R—C phase included in Example 1 and of the $F_2Fe_{14}B$ phase that is the main phase, the R and C concentrations of the R—C phase were both higher than those of the main phase. Also, as shown in Table 3, the C concentration in the R—C phase was more than 20 at % higher than in the main phase. Because the C included in the R—C phase is a value that includes contamination of the sample surface, assuming that the same level of contamination exists in the main phase as well, one can conclude that the increase from the main phase is C that is included within the R—C phase.

Examples 3 and 4

The raw materials were weighed out such as to give the Alloy A composition in Table 1, and an alloy ribbon was produced in the same way as in Example 1. Next, hydrogen decrepitation of the alloy ribbon was carried out to give a coarse powder. The coarse powder thus obtained, without the addition of lubricant thereto, was then subjected to fine pulverizing to an average particle size of about 3.5 μm with a jet mill in a stream of nitrogen. Next, 0.1 wt % of the C source shown in Table 4 was added, after which pressing and heat treatment were carried out by the same method as in Example 1, giving a sintered body, the composition of which was analyzed in the same way as in Example 1. The results are shown in Table 4.

TABLE 4

| | Type of alloy | C source | [C] (at %) | [N] (at %) | [O] (at %) | Areal ratio of R—C phase (%) | Br (T) | $H_{cJ}$ (kA/m) |
|---|---|---|---|---|---|---|---|---|
| Example 3 | Alloy A | carbon black | 0.44 | 0.3 | 0.2 | 0.30 | 1.43 | 1,200 |
| Example 4 | Alloy A | paraffin | 0.42 | 0.3 | 0.2 | 0.26 | 1.43 | 1,210 |

As shown in Table 4, in cases where C sources differing from lubricants were added, the areal ratio of the R—C phase included in the magnet could in both cases be set to more than 0 and up to 0.5% and it was possible to achieve about the same areal ratio as in Example 1 in which the same amount of lubricant was added. Regarding the magnetic properties in these Examples, although the Br decreases with worsening of the orientation, the $H_{cJ}$ rises with worsening of the orientation, becoming about 80 kA higher than in Example 1. Hence, the $H_{cJ}$ expected from the orientation and the $-4\times10^{-4}$ T/(kA/m) relationship in Hd can be obtained, and so it was possible to achieve good magnetic properties even in cases where a C source other than stearic acid as the lubricant was used.

The invention claimed is:

1. An R—Fe—B-type sintered magnet having a composition which consists essentially of from 12.5 to 14.5 at % of R (where R is one or more element selected from the rare-earth elements, with Nd being essential), from 5.0 to 6.5 at % of B, from 0.15 to 5.0 at % of M (where M is one or more element selected from Si, Al, Mn, Ni, Co, Cu, Zn, Ga, Ge, Pd, Ag, Cd, In, Sn, Sb, Pt, Au, Hg, Pb and Bi), from 0.02 to 0.5 at % of X (where X is one or more element selected from Ti, Zr, Hf, Nb, V and Ta), from 0.1 to 1.6 at % of C and from 0.2 to 0.5 at % of O, with the balance being Fe and inadvertent impurities, and which contains a main phase that is an $R_2Fe_{14}B$ intermetallic compound and a grain boundary phase, wherein the sintered magnet has, in the grain boundary phase, an R-C phase with higher R and C concentrations than the main phase, the areal ratio of the R-C phase in a cross-section of the R—Fe—B-type sintered magnet being greater than 0 and up to 0.5%.

2. The R—Fe—B-type sintered magnet of claim 1, wherein the content of R is from 12.8 to 14.0 at %.

3. The R—Fe—B-type sintered magnet of claim 1, wherein the content of C is from 0.2 to 1.0 at %.

4. The R—Fe—B-type sintered magnet of claim 1, wherein the content of B is from 5.2 to 5.9 at %.

5. The R—Fe—B-type sintered magnet of claim 1, wherein the magnet includes, as a portion of the M elements, more than 0 and up to 0.1 at % of Ga.

6. The R—Fe—B-type sintered magnet of claim 1, wherein the R-C phase has a C concentration that is at least 20 at % higher than in the main phase.

* * * * *